Sept. 17, 1940.  G. R. ERICSON  2,214,922
PULSATING PRESSURE DEVICE
Filed Feb. 10, 1938  2 Sheets-Sheet 2
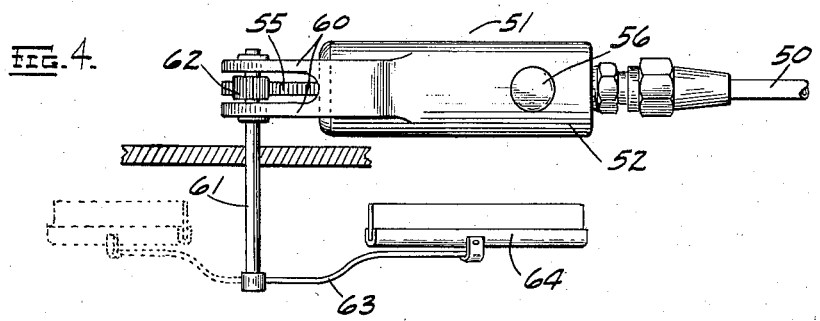
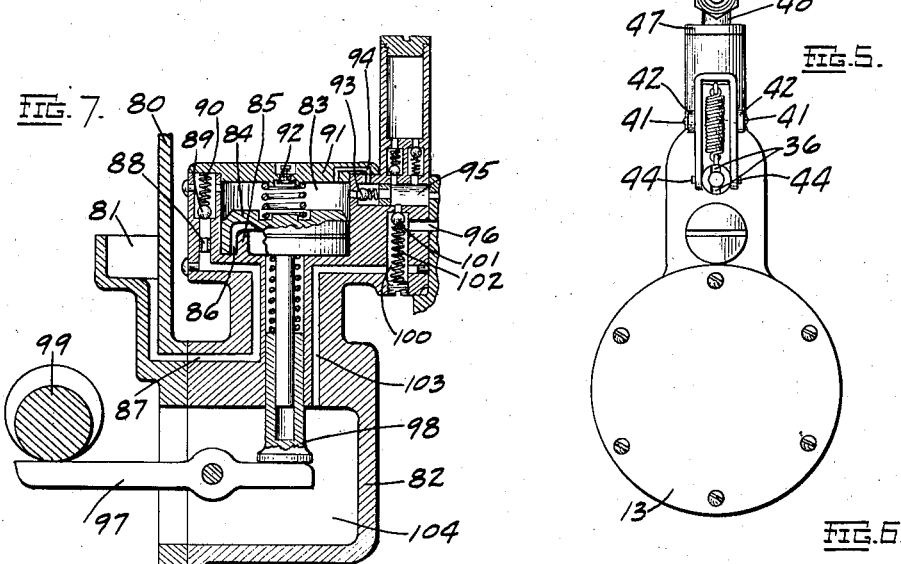
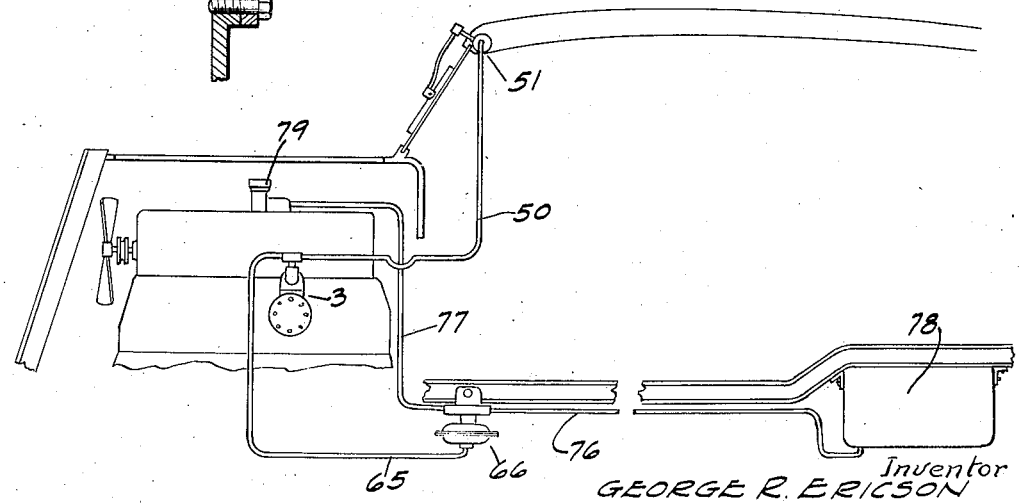
Inventor
GEORGE R. ERICSON
By Donald U. Rich
Attorney Patented Sept. 17, 1940

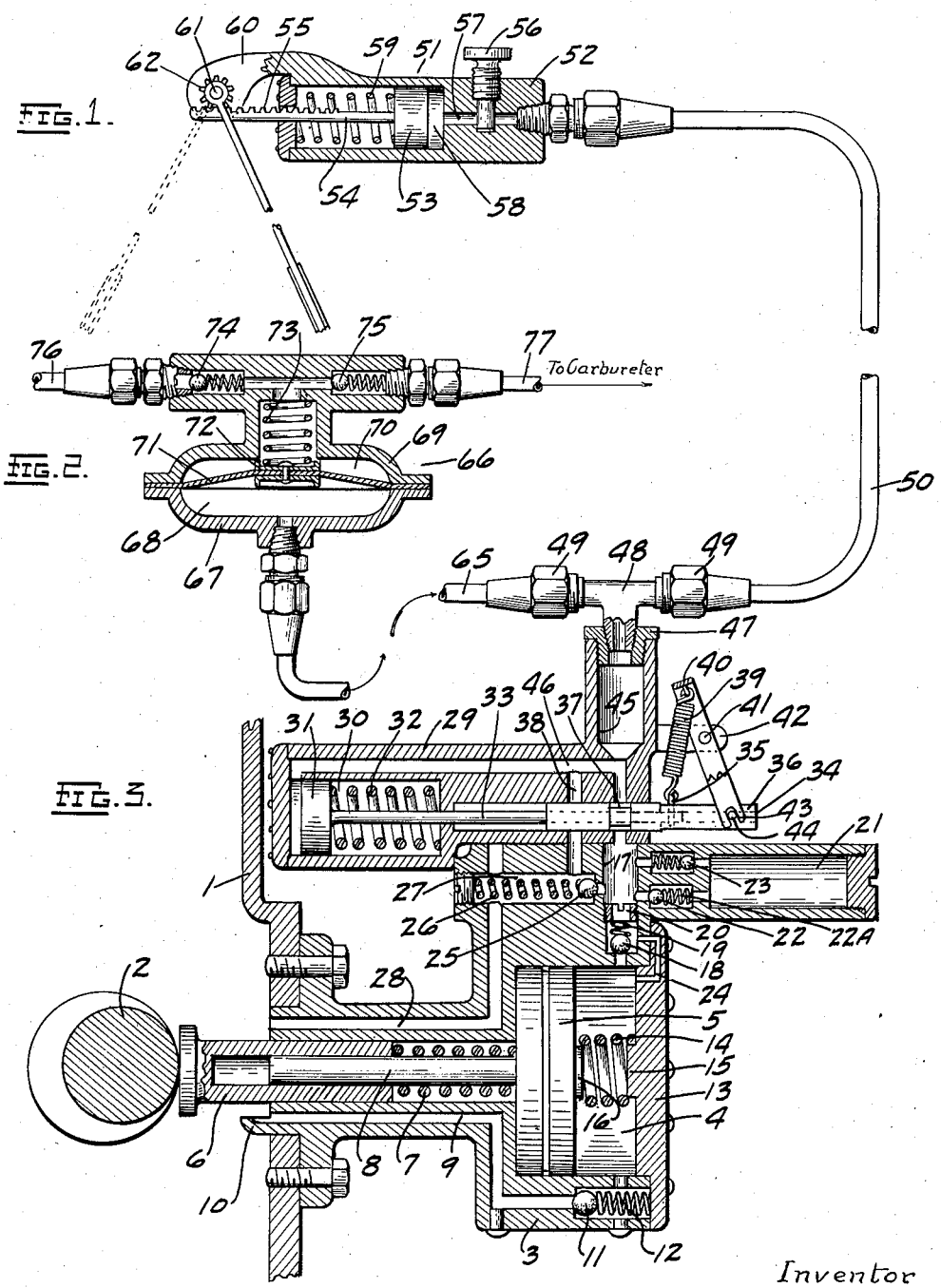

2,214,922

UNITED STATES PATENT OFFICE 2,214,922

PULSATING PRESSURE DEVICE

George R. Ericson, St. Louis, Mo., assignor to Carter Carburetor Corporation, St. Louis, Mo., a corporation of Delaware Application February 10, 1938, Serial No. 189,814

4 Claims. (Cl. 230—22)

This invention relates to improvements in automobiles and more particularly to improvements in engine driven pulsators for operating such accessories as windshield wipers and fuel pumps. Current practice is to drive the fuel pump mechanically directly from the cam shaft of the engine and operate the windshield wiper by the suction created in the intake manifold. For most satisfactory operation both of these devices should be driven at a substantially constant speed. This is not possible in the case of the present fuel pumps which are driven directly, and their speed is in accordance with engine speed, which, under operating conditions, varies widely. Difficulty is also experienced with windshield wipers which are ordinarily driven by manifold suction. With the throttle in a wide open position and the engine under a substantial load, there is not enough manifold suction to operate the wiper and it may go out of operation altogether.

Fuel supply devices operated by vacuum have also proved unsatisfactory due to the uncertainty of manifold vacuum. One of the main disadvantages with the known engine driven fuel pumps is that the fuel must be drawn from the rear tank up to the pump which is adjacent the engine and heat generated by the engine is transferred to the fuel. Under conditions where the temperature is high, the fuel boils thereby involving a difficulty known as vapor lock which is well understood by those skilled in the art and requires no further discussion here.

The object of my invention is to produce a means to operate a windshield wiper and fuel pump at a substantially uniform speed, regardless of the change in speed of the engine and the load applied thereto.

Another object of the invention is to provide means for forcing the fuel from the rear tank to the carburetor and thereby preventing vapor lock. I attain these objects by a novel device which produces pressure pulsations at a substantially uniform rate and it may be driven either by the engine or an electric motor. The pulsator is connected to the pressure translating fluid motors by fluid conduits and either a gas or liquid may be used as a pulsating medium.

The invention will be better understood upon reference to the following specification and accompanying drawings in which:

Fig. 1 is a cross sectional view of a windshield wiper and motor.

Fig. 2 is a cross sectional view of a fuel pump utilizing fluid pressure pulsations.

Fig. 3 is a vertical sectional view of a pulsation producing and controlling device, hereafter termed the pulsator, embodying a form of the invention.

Fig. 4 is a top view of the windshield wiper shown in Fig. 1.

Fig. 5 is an end view of the pulsator shown in Fig. 3.

Fig. 6 is a diagrammatic representation showing a pressure producing and pressure operated device embodying the invention and applied to an automobile.

Fig. 7 is a cross sectional view of a pulsator embodying another form of the invention.

The reference numeral 1 indicates a portion of the crank case of an internal combustion engine, having a conventional cam shaft 2. The pulsator comprises a body member 3 which is bolted or otherwise detachably connected to the crank case 1. A cylinder 4 is preferably formed integrally with the body member 3 and contains a piston 5. A push rod 6 transmits pressure from cam shaft 2 through spring 7 to the piston 5. Spring 7 is guided by a rod 8 connected to the piston 5. An inlet passageway 9 communicates with the crank case, and at the end of this passageway a basin is formed on body 3 protruding into the crank case and serving to trap some of the oil spray within the case and mix oil with the intake air to lubricate the cylinder 4. At the cylinder end of passageway 9, an intake ball check 11 and ball check spring 12 are provided. Cylinder 4 is capped by a cylinder head 13. A coil spring 14 is held between the piston 5 and the cylinder head 13 by a boss 15 on the cylinder head and a similar boss 16 on the piston. The outlet passageway 17 is equipped with a ball check 18, a spring 19 and a threaded retaining collar 20. In communication with passageway 17 is a pressure storage chamber 21 which is provided with an inlet ball check 22 and an outlet ball check 23, respectively. Passageway 24 is a bypass from the cylinder 4 to the passage 17 around the ball check 18. Ball check 25, loaded by spring 26, unseats when excess pressure develops in passage 17 and exhausts same from valve chamber 27 into outlet passage 28 which communicates with the engine crank case. To the top of body member 3 is attached a valve body member 29. In the valve body member 29 is formed a cylinder 30 which is fitted with a piston 31 urged toward one end of the cylinder by a spring 32. A piston rod 33 extends longitudinally through the sliding tubular valve member 34 and eye-bolt or pin 35 is attached to piston rod 33 and extends laterally through a slot 36 in valve 34. The reduced portion 37 of valve 34 acts as a passageway when it is in line with passages 17 or 38. Spring 39 is connected to pin 35 and toggle yoke 40 and acts to position valve 34 with respect to movement of piston 31. Toggle yoke 40 is pivoted by pins 41 to stanchions 42 which are preferably cast integral with the valve body 29. Slot 43 in toggle yoke 40 receives trunnion pins 44 and forms a connection between the yoke 40 and valve 34. A section of the outlet passageway is enlarged in the form of chamber 45 to trap any lubricant which might be entrained in the air stream during the process of compression and which is not desirable to have circulated through the balance of the system. Such lubricant will be returned to the crank case during the exhaust cycle of the system through passages 46, 38, 27 and 28. In the top of chamber 45 a screw nipple 47 is attached which receives an outlet T-fitting 48. The ends of fitting 48 are adapted to receive suitable standard tube connection fittings 49. Conduit 50 connects the windshield wiper motor 51 to the pulsator. Device 51 comprises a housing 52 which is fitted with a piston 53 having a connecting rod 54 on which is formed a gear rack 55. Thumb screw valve 56 controls the pulsating fluid stream through passageway 57 from conduit 50 to cylinder 58. Spring 59 urges piston 53 toward the intake end of cylinder 58. A pair of arms 60 extend from body 52 and form bearings for oscillating shaft member 61. Attached to oscillating shaft 61, at one end, is a pinion 62 which meshes with rack 55. To the opposite end of shaft 61 is attached an arm 63 having a wiper blade 64.

Also connected to T-fitting 48 is conduit 65 which communicates with fuel pump device 66. Translating device 66 is composed of a lower body member 67 in which is formed a chamber 68. Upper body member 69 has a similar chamber 70. Chambers 68 and 70 are partitioned by a diaphragm 71 to which is attached a spring retaining part 72. 73 is a compression spring constantly urging diaphragm 71 downwardly. Upper body 69 has inlet and outlet check valves 74 and 75, respectively. Conduit 76 conducts the fuel from the automobile supply tank 78 (Fig. 6) to the device 66 and conduit 77 conveys the fuel to engine carburetor 79.

When the pulsator is at rest, as in Fig. 3, with the push rod contacting the low side of the cam lobe on cam shaft 2, spring 14 will hold the piston 5 in a position at the end of its intake stroke and will compress spring 7 just enough to eliminate lash between the push rod 6 and the piston 5. Spring 7 is calibrated to compress when a predetermined pressure is reached in cylinder 4 thereby permitting push rod 6 to reciprocate by action of cam shaft 2 without causing movement of piston 5. At cranking speeds with the cam shaft turning about 40 R. P. M. and with the slide valve 34 held in its rest position by spring 32, as shown in Fig. 3, each pressure impulse created by the piston 5 will be transmitted through conduit 65 to the fuel pump device 66, causing yielding of spring 73 and diaphragm 71 and consequent expansion of chamber 68 causing fuel above the diaphragm to be expelled past valve 75 and through conduit 77 to carburetor 79. Valve spring 12 is so calibrated that during the intake stroke, at cranking speeds, ball check 11 will not unseat, and air, which has been compressed in the passages and lines to the fuel pump chamber 68, will be drawn back into the cylinder 4 through the metered by-pass 24, and diaphragm 71 in the fuel pump will return to its initial position by pressure of spring 73 and suck fuel into the pump through conduit 76 from the supply tank 78. At cranking speed, the device will perform as a closed system pulsator and the diaphragm in the fuel pump will respond to each reciprocation of the piston 5.

Ordinarily, at such times when the engine is being cranked, the use of the windshield wiper is not required but if the valve 56 is in an open position the piston 53 of the wiper will react to the pressure impulses of the piston 5 in the same way as the diaphragm 71 does in the fuel pump. The cylinder 4 is of such size that both windshield wiper and fuel pump may be operated at the same time and the travel of the piston 5 to the end of its compression stroke after diaphragm 71 and piston 53 have reached the ends of their strokes is accompanied by compression of the fluid in the lines. During cranking, only a small amount of pressure is developed and spring 22a will prevent ball check 22 from unseating. The ball check 22 will isolate the compression chamber 21 during the cranking period and, therefore, hold the conduit and passageway volume to a minimum to obtain maximum pressure at each impulse for operation of the motors. Spring 32 is also calibrated so that it will not be affected by pressures developed at cranking speed and will not permit movement of piston 31, thereby preventing a change in position of valve 34. After the engine has started to fire and the cam shaft speed increases, the pressure builds up in the system and the pulsations which were usable at lower speeds to operate the fuel pump and windshield wiper motors begin to dampen out as the speed increases. When a predetermined pressure is reached, spring 32 begins to yield to the pressure exerted on piston 31 permitting rod 33 to change the lower anchorage position of spring 39. When the lower end of spring 39 is carried beyond the center of toggle yoke 40, spring tension will cause the lower end of toggle 40 to snap over in a clockwise direction and move the reduced section of valve 34 in line with exhaust port 38.

It will be noted that up to this part of the cycle, the pressure will have expanded the chambers of the fuel pump and windshield wiper. After the reduced section 37 of valve 34 is in line with exhaust port 38, passageway 17 is closed off and the system is brought back to atmospheric pressure by exhausting through passages 27 and 28 into the crank case. By-pass 24 is not sufficient in size to affect the operation of the device at normal running speeds but is calibrated to function only at cranking speeds in a manner already described. Ball check 25 and spring 26 act as a relief valve to maintain a maximum constant pressure in chamber 21 and passage 17. Therefore, the toggle mechanism operated by the pressure on piston 31 will work at a substantially constant rate and will deliver pressure impulses of magnitude and speed which are usable in operating motor devices 51 and 66 regardless of variations in engine speed.

Fig. 7 shows a form of the invention which provides means to seal the space between the piston and cylinder thereby preventing leakage of pressure at that point. Reference numeral 80 indicates a portion of the crank case of an internal combustion engine having a pocket 81 cast integrally therewith, which collects oil splashed into it from the crank case by the moving parts of the engine. This pocket may also be supplied by a pressure line from the engine oil pump. 82 is a pulsator body member bolted or otherwise detachably connected to the crank case 80. A cylinder 83 is formed in the body member 82 and is fitted with a piston 84. Within the cylinder 83 is an annular wall 85 which forms an annular pocket 86 with the cylinder wall. Pocket 86 is so formed that the skirt of piston 84 depends into it when the piston 84 is at the bottom of its stroke. Passageway 87 connects the oil pocket 81 with the cylinder 83 and is highly restricted by a tubular plug 88. 89 constitutes an inlet ball check valve acted upon by spring 90 which opens on each intake stroke of piston 84 to permit a small amount of oil to be drawn into the cylinder 83. The upper edge of piston 84 is chamfered so that the oil will readily drain to the annular space between the piston and the cylinder wall and will partly fill pocket 86. Each time the piston comes down the skirt dips into the oil in pocket 86 and distributes a sufficient amount over the cylinder wall on each up stroke to maintain a good liquid seal between the piston and cylinder. Cylinder head 91 is provided with an air port controlled by a spring loaded inlet air valve 92. The resistance to entry of air through this port is substantially less than the resistance offered to entry of oil through passage 87 and restriction 88 and, therefore, only a small quantity of oil will be drawn in at each suction stroke of the piston. The cylinder is constructed with an outlet check valve 93 and a by-pass 94 which has the same function as the similar elements 18 and 24 of the device previously described and shown in Fig. 3. Passageways 95 and 96 correspond to 17 and 38, respectively, of Fig. 3. The figure is broken away at the point where passageways 95 and 96 communicate with the toggle valve housing to avoid repetition, inasmuch as this part of the unit would be identical with the structure shown in Fig. 3.

The piston driving mechanism, shown in Fig. 7, is similar in principle to that shown in Fig. 3 except that a lever arm 97 has been added to impart reciprocating motion to the piston push rod 98 from the cam shaft 99 so that the piston 84 and cylinder 83 could be set in a vertical position required for the oil seal feature already described. Passageway 96 extends into chamber 100 which contains ball check 101, controlled by spring 102. Ball check 101 unseats when the pressure of the piston reaches a predetermined maximum and exhausts the excess fluid pressure into passageway 103 which communicates with the chamber 104 formed in body member 82. One end of chamber 104 opened to the crank case, forms the means for returning excess lubricant that might have gotten into the system and is returned by the exhaust fluid stream through passageway 96. In diagrammatic Fig. 6 the pumping device 66 is shown bolted to the chassis frame in close proximity to the automobile engine. This location is usually, sufficiently far from the engine to prevent the transmission of engine heat to the fuel, thereby diminishing or avoiding vapor lock. The pump 66 will operate satisfactorily at any place in the line between the carburetor 79 and the rear tank 78. However, it may be desirable as an economy measure to conserve on the length of fluid line 65 and mount the pump as close to the engine as possible without locating it within the heat zone.

The invention may be embodied in other forms than those shown as will occur to those skilled in the art. For instance, by merely reversing the relationship of valves 11 and 18 and the position of spring 32, the pulsator may be arranged to produce negative pressures or suctions instead of positive pressures, as shown. The exclusive use of all such modifications as come within the scope of the appended claims is contemplated.

I claim:

1. In a device for supplying fluid pressure pulsations, a variable speed pulsating pump having an outlet valve yieldingly urged closed, a conduit for transmitting pulsations to a fluid motor, means responsive to predetermined pressure in said conduit for alternately connecting the same to said pump and to a different source of fluid pressure, and a restricted by-pass around said outlet valve for transmitting pulsations from said pump directly to said conduit when said outlet valve is closed.

2. A device as specified in claim 1 further including a pressure accumulating chamber having communication with said conduit and having inlet and outlet valves in said communication, said inlet valve being openable only when greater than said predetermined pressure exists in said conduit.

3. In combination with a variable speed reciprocating pump having an outlet valve yieldingly urged closed, a device for supplying pressure pulsations at rates substantially lower than the normal vibrating rate of said pump comprising a conduit for transmitting the pressure pulsations to a motor and having a connection to said pump and a connection to a different source of fluid pressure, valve means for alternately opening said conduit to said connection, said conduit being normally opened to said pump, means responsive to a predetermined pressure in said conduit for reversing said valve means, snap action mechanism for returning said valve means to the original position when reversed whereby said pressure responsive means constitutes a rate of pulsation control, and a restricted by-pass around the pump outlet valve for transmitting pump pulsations directly to said conduit when less than said predetermined pressure exists therein.

4. In a device for supplying fluid pressure pulsations, a variable speed pulsating pump having a yieldingly seated outlet valve, a conduit for transmitting pressure pulsations to the work, a passage for exposing the work to a different source of fluid pressure, valve means controlling said conduit and said passage, a device responsive to predetermined fluid pressure in said conduit to shift said valve means so as to alternately expose the work to pressure conditions in said conduit and said passage, said pump outlet valve being yieldable under the influence of pump pressure equivalent to said predetermined pressure, and a restricted by-pass around said outlet valve for transmitting the pump pulsations directly to the work when said outlet valve is closed.

GEORGE R. ERICSON.